(12) United States Patent
Kaiga

(10) Patent No.: US 11,988,984 B2
(45) Date of Patent: May 21, 2024

(54) IMAGE FORMING APPARATUS INCLUDING USER INTERFACE UNIT FOR INPUTTING OR OUTPUTTING INFORMATION

(71) Applicant: CANON KABUSHIKI KAISHA, Tokyo (JP)

(72) Inventor: Miho Kaiga, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/295,750

(22) Filed: Apr. 4, 2023

(65) Prior Publication Data

US 2023/0244174 A1     Aug. 3, 2023

Related U.S. Application Data

(63) Continuation of application No. 17/207,484, filed on Mar. 19, 2021, now Pat. No. 11,650,531.

(30) Foreign Application Priority Data

Mar. 24, 2020 (JP) .................. 2020-052383

(51) Int. Cl.
*G03G 15/00* (2006.01)
*H04N 1/00* (2006.01)
*H04N 1/44* (2006.01)

(52) U.S. Cl.
CPC ..... *G03G 15/5016* (2013.01); *H04N 1/00352* (2013.01); *H04N 1/00557* (2013.01); *H04N 1/00891* (2013.01); *H04N 1/442* (2013.01)

(58) Field of Classification Search
CPC ........... G03G 15/5016; H04N 1/00352; H04N 1/00557; H04N 1/00891; H04N 1/442
See application file for complete search history.

(56) References Cited

U.S. PATENT DOCUMENTS

| 2010/0073295 | A1* | 3/2010 | Zhan | G06F 3/021 345/168 |
| 2012/0027488 | A1* | 2/2012 | Otoshi | B41J 35/36 400/223 |
| 2013/0083344 | A1* | 4/2013 | Funakawa | H04N 1/00127 358/1.14 |
| 2015/0131121 | A1* | 5/2015 | Kang | H04N 1/00472 358/1.15 |
| 2019/0300357 | A1* | 10/2019 | Crawford | G06Q 20/40145 |

FOREIGN PATENT DOCUMENTS

| CN | 101326467 A | 12/2008 |
| CN | 103092037 A | 5/2013 |
| CN | 104020648 A | 9/2014 |
| CN | 105227800 A | 1/2016 |
| CN | 105383191 A | 3/2016 |
| JP | 2006181803 A | 7/2006 |
| JP | 2019209557 A | 12/2019 |

\* cited by examiner

*Primary Examiner* — Moustapha Diaby
(74) *Attorney, Agent, or Firm* — Canon U.S.A., Inc. I.P. Division

(57) ABSTRACT

An image forming apparatus includes an image forming unit configured to form an image on a recording material, a controller configured to control the image forming unit, a sheet feeding tray configured to store a recording material to be supplied to the image forming unit, and a sheet feeding tray cover configured to cover an access point of the sheet feeding tray. The sheet feeding tray cover includes a user interface for inputting information into a controller unit or outputting information from the controller.

13 Claims, 8 Drawing Sheets

IMAGE FORMING APPARATUS INCLUDING USER INTERFACE UNIT FOR INPUTTING OR OUTPUTTING INFORMATION

CROSS-REFERENCE TO RELATED APPLICATIONS

The present application is a continuation of U.S. patent application Ser. No. 17/207,484, filed on Mar. 19, 2021, which claims priority from Japanese Patent Application No. 2020-052383, filed on Mar. 24, 2020, which are hereby incorporated by reference herein in their entireties.

BACKGROUND OF THE INVENTION

Field of the Invention

The present invention relates to an image forming apparatus that forms an image on a recording medium. In particular, the image forming apparatus includes a user interface unit for inputting or outputting information.

Description of the Related Art

Conventionally, a printer that is an image forming apparatus includes an operation unit having a plurality of operation keys to be operated by a user, and a display unit that displays information to users using a liquid crystal panel and a light emitting diode (LED). The operation unit and the display unit are disposed on an upper surface or a front surface of the main body of the image forming apparatus in order to keep the visibility of the display unit appropriate and enhance the operability of the operation unit (Japanese Patent Laid-Open No. 2000-015891).

In recent years, there has been discussed a configuration including a large display unit to improve visibility and a configuration including a large touch panel to improve operability and visibility. In addition, there has been discussed a configuration including various user interfaces such as a motion sensor, a biometric sensor, and a port for wireless communication such as near field communication (NFC), besides an operation unit and a display unit. These user interfaces are often disposed on a top surface or a front surface of the main body of the image forming apparatus in order to achieve a configuration in which visibility and operability are further improved for users.

Meanwhile, downsizing of the image forming apparatus has been desired. The top surface and the front surface of the main body of the image forming apparatus each have an area where a user interface can be disposed without impairing visibility and operability for users, but in recent years, this area has been reduced.

Therefore, it has been desired to provide an image forming apparatus that allows various user interfaces to be disposed thereon without impairing the visibility and the operability of the user interfaces, while achieving downsizing of the image forming apparatus.

SUMMARY OF THE INVENTION

According to an aspect of the present invention, an image forming apparatus includes an image forming unit configured to form an image on a recording material, a controller configured to control the image forming unit, a sheet feeding tray configured to store a recording material to be supplied to the image forming unit, and a sheet feeding tray cover configured to cover an access point of the sheet feeding tray. The sheet feeding tray cover includes a user interface unit for inputting information into the controller or outputting information from the controller.

Further features of the present invention will become apparent from the following description of exemplary embodiments with reference to the attached drawings.

DESCRIPTION OF THE EMBODIMENTS

Figure 1:
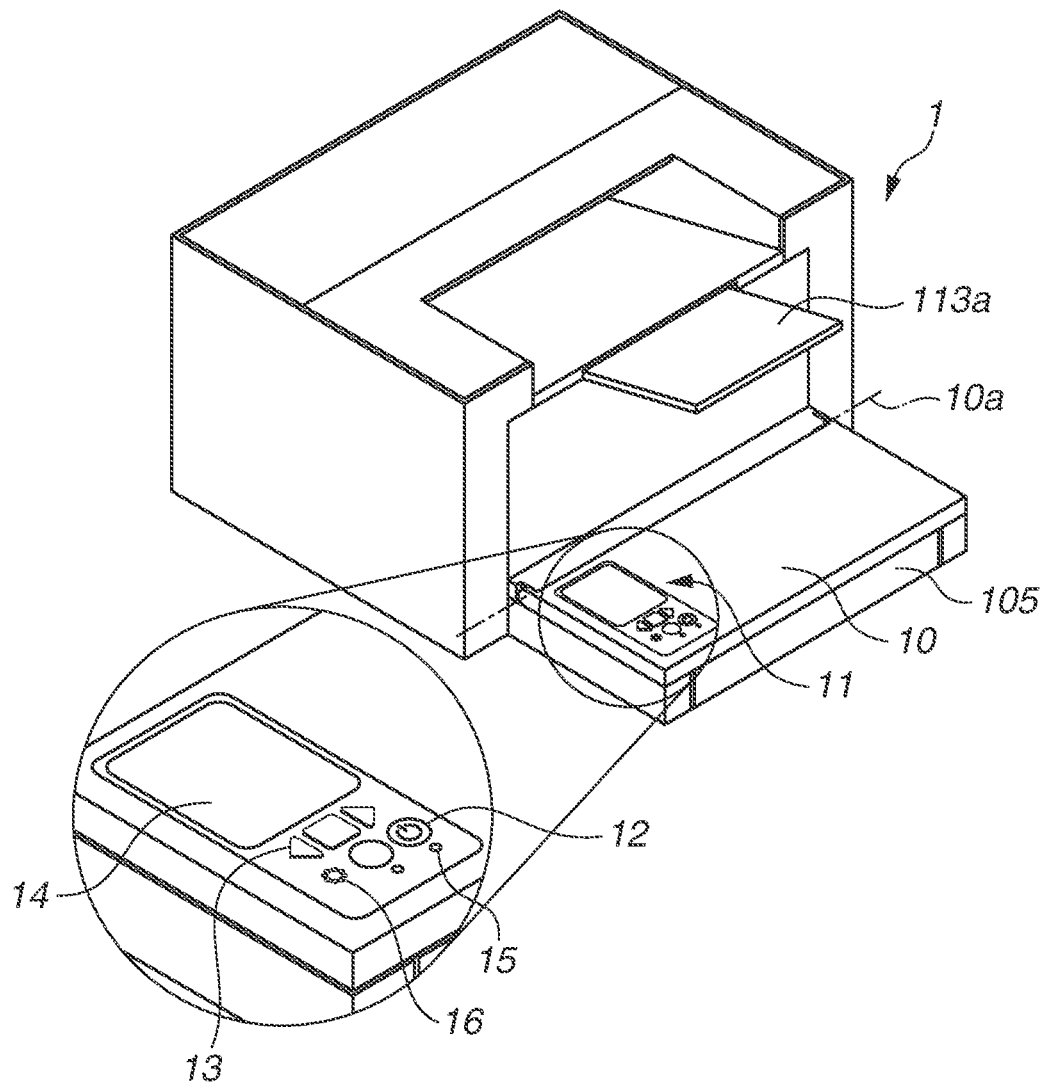
FIG. 1 is a perspective view schematically illustrating an image forming apparatus according to a first exemplary embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted. Each of the embodiments of the present invention described below can be implemented solely or as a combination of a plurality of the embodiments. Also, features from different embodiments can be combined where necessary or where the combination of elements or features from individual embodiments in a single embodiment is beneficial.

First Exemplary Embodiment

A printer 1 serving as an image forming apparatus according to the first exemplary embodiment of the present invention will be described with reference to FIGS. 1 to 3B. In the following description, an up-down direction is defined based on the upper side and the lower side in the vertical direction as up and down, respectively. Further, a front-back direction is defined based on the front side and the back side of the printer 1 as front and back, respectively. Furthermore, a left-right direction is defined based on the left side and the right side of the printer 1 as left and right, respectively, in a state where the printer 1 is viewed from the front of the printer 1 in the backward direction. The printer 1 may have a controller (e.g. CPU, processor, processing circuitry, control circuitry) configured to control an image forming unit.

Figure 2:
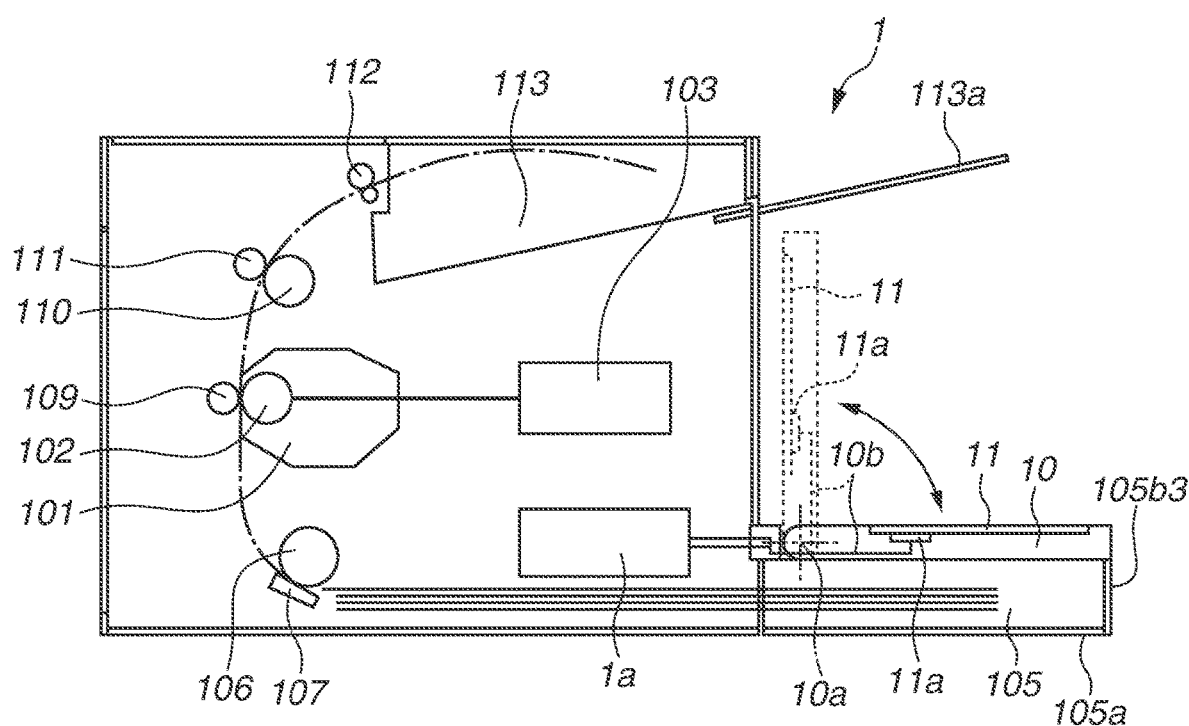
FIG. 2 is a cross-sectional view schematically illustrating a basic configuration of the image forming apparatus according to the first exemplary embodiment.
Figure 3A:
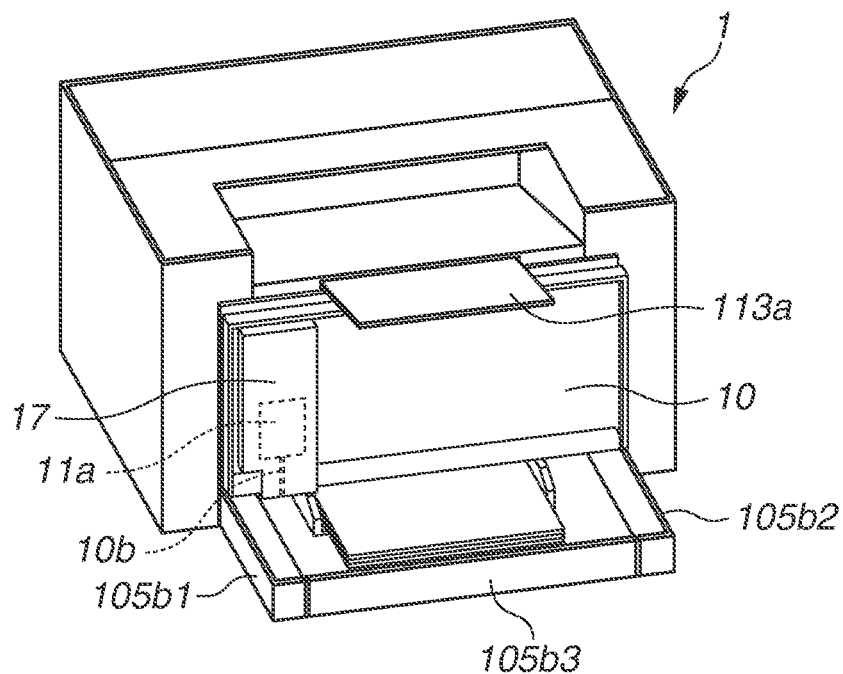
FIG. 3A is a perspective view schematically illustrating the image forming apparatus according to the first exemplary embodiment in a state where a sheet feeding tray cover is open.
Figure 3B:
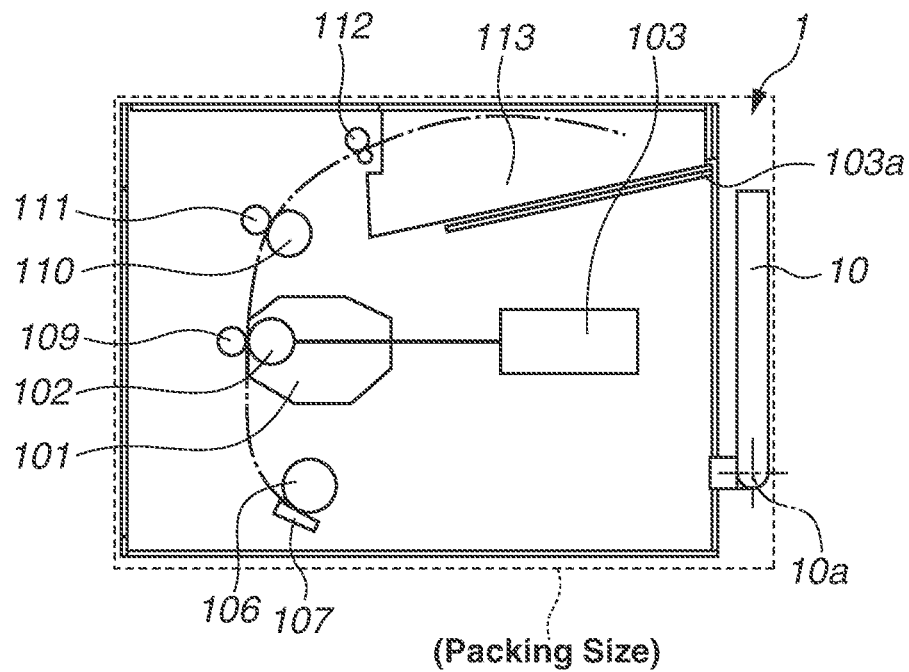
FIG. 3B is a cross-sectional view schematically illustrating the image forming apparatus according to the first exemplary embodiment in the state where the sheet feeding tray cover is open.

First, a basic configuration and operation of the printer 1 will be described with reference to FIG. 2. The printer 1 is a laser beam printer to which a cartridge 101 is attached, and thereby forms an image by an electrophotographic method and records the image on a recording material such as paper. The printer 1 includes a sheet feeding tray 105, a sheet-feeding/conveyance unit, an image forming unit and a fixing unit.

The sheet feeding tray 105 is provided in a lower part of the printer 1 and stores therein recording materials on which an image is to be formed. The sheet-feeding/conveyance unit separates the recording materials in the sheet feeding tray 105 one by one using a sheet feeding roller 106 and a sheet separation unit 107, and supplies the recording material to the image forming unit. Afterward, the sheet-feeding/conveyance unit conveys the recording material to a sheet discharge stacking portion 113 disposed in an upper part of the printer 1 via the fixing unit, or conveys the recording material to a sheet discharge extension tray 113*a* drawn from the sheet discharge stacking portion 113 and the main body of the printer 1.

The image forming unit includes a scanner unit 103 that emits a laser beam based on image information, the cartridge 101 that forms a toner image, and a transfer roller 109 that transfers the toner image to the recording material.

The cartridge 101 includes a housing, a photosensitive drum 102 rotatably disposed in the housing, and a charging unit (not illustrated) that charges a surface of the photosensitive drum 102, and a developing unit that forms a toner image using a toner serving as a developer on the surface of the photosensitive drum 102. The transfer roller 109 is disposed to face the photosensitive drum 102 of the cartridge 101 and forms a transfer nip portion with the photosensitive drum 102.

The fixing unit includes a fixing film 110, a pressure roller 111 and a heater (not illustrated). The pressure roller 111 is in pressure contact with the fixing film 110. A fixing nip portion is thereby formed. The fixing unit is thus configured such that a fixing nip portion is formed therebetween.

When the printer 1 receives a print signal from a host computer (not illustrated), the image forming unit irradiates the surface of the photosensitive drum 102 charged by the charging unit with a laser beam from the scanner unit 103 based on image information from the host computer and thereby forms an electrostatic latent image thereon. The electrostatic latent image corresponding to the image information is developed using the toner in the developing unit, so that a toner image is formed. Meanwhile, when the print signal is received from the host computer (not illustrated), the sheet-feeding/conveyance unit separates the recording materials in the sheet feeding tray 105 one by one using the sheet feeding roller 106 and the sheet separation unit 107 to feed the recording material. The sheet-feeding/conveyance unit then conveys the separated recording material to a transfer nip portion. The transfer nip portion is formed by the photosensitive drum 102 and the transfer roller 109 that are in pressure contact with each other. The toner image on the photosensitive drum 102 is transferred to the recording material at the transfer nip portion. The recording material to which the toner image is transferred is conveyed to the fixing nip portion formed by the fixing film 110 and the pressure roller 111. At the fixing nip portion, the recording material to which the toner image is transferred is heated by the heater and pressed by the fixing film 110 and the pressure roller 111, so that the toner image is fixed onto the recording material. The recording material on which the toner image is fixed is conveyed by a sheet discharge roller pair 112 of the sheet-feeding/conveyance unit and then discharged to the sheet discharge stacking portion 113 disposed in the upper part of the printer 1, or to the sheet discharge stacking portion 113 and the sheet discharge extension tray 113*a*, and hence the image formation on the recording material is completed.

(Sheet Feeding Tray)

Next, a configuration of the sheet feeding tray 105 of the present exemplary embodiment will be described.

As illustrated in FIG. 1, the sheet feeding tray 105 is provided in the lower part of the main body of the printer 1 such that the sheet feeding tray 105 protrudes from the front of the main body of the printer 1. As a result of downsizing the printer 1, the depth of the printer 1 in the front-back direction is shorter than the length in a conveyance direction of a recording material on which an image can be formed. For this reason, in a state where a recording material on which an image is to be formed is placed in the printer 1, the rear edge of the recording material protrudes from the front surface of the printer 1. The sheet feeding tray 105 is thus provided to store at least the rear edge of the recording material protruding from the main body of the printer 1. A sheet feeding tray cover 10 is disposed on the sheet feeding tray 105. The sheet feeding tray cover 10 is provided to cover recording materials stored in the sheet feeding tray 105.

The sheet feeding tray 105 includes a stacking face 105*a* on which recording materials are stacked, a left face 105*b*1, a right face 105*b*2 and a front face 105*b*3. The left face 105*b*1, the right face 105*b*2, and the front face 105*b*3 are disposed around the stacking face 105*a* to protrude from the stacking face 105*a* upward in the vertical direction. In this way, the left face 105*b*1, the right face 105*b*2, and the front face 105*b*3 are configured to support the sheet feeding tray cover 10 in a state where the sheet feeding tray cover 10 covers an access point of the sheet feeding tray 105.

One end of the sheet feeding tray cover 10 is connected to the main body of the printer 1 so that the sheet feeding tray cover 10 is rotatable around a hinge center 10*a* relative to the main body of the printer 1. In normal printing, the sheet feeding tray cover 10 covers the sheet feeding tray 105. When a user places recording materials in the sheet feeding tray 105, a user brings the sheet feeding tray cover 10 into a state illustrated in FIG. 2 (with broken lines) and FIG. 3A by rotating the sheet feeding tray cover 10 around the hinge center 10*a* relative to the main body of the printer 1. In this way, the inside (the stacking face 105*a*) of the sheet feeding tray 105 where the recording materials are stacked becomes visible to the user, so that the user can replenish recording materials in the sheet feeding tray 105.

(User Interface)

The printer 1 is provided with various user interface units (hereinafter referred to as user interfaces). A user interface is provided for inputting information in the image forming unit by the user, for outputting information from the image forming unit to notify the user of the information, and for performing at least one of inputting and outputting of information.

In the present exemplary embodiment, an operation unit 11 serving as a user interface is disposed on the top surface of the sheet feeding tray cover 10. The operation unit 11 includes a power switch 12, a plurality of operation keys 13, a display portion 14, a power light emitting diode (LED) 15, and a speaker 16. In this way, the operation unit 11 having a plurality of functions is provided as a user interface in the present exemplary embodiment. The user interface unit may be configured to input information into a controller or output information from the controller. The controller and the user interface unit may be connected by a flexible wiring. The controller and the user interface unit may be connected by wireless communication in which information is transmitted by radio waves.

When the user uses the printer 1, the user presses the power switch 12 so that the main body of the printer 1 is powered on and the power LED 15 is lit. This enables the user to easily recognize the power ON or OFF state. The display portion 14 displays information about the printer 1, such as various settings, a network status, and the content of an error. When the user performs operations such as paper type setting, sheet feeding slot setting, various modes setting, and resetting, the operations can be performed using the various operation keys 13 as appropriate. The speaker 16 serving as a sound output device in the operation unit 11 is configured to output an operation sound, a notification sound and an audio guide. As the operation keys in the present exemplary embodiment, components by which the user causes a change in an electric circuit of the image forming apparatus are employed. However, the operation keys may not be mechanical push switches and may be replaced by a resistive-type (pressure-type) input device such as a capacitive-type touch panel.

The operation unit 11 contains an electric board 11a, and the electric board 11 is connected to a signal processor 1a (controller) of the image forming unit (the main body of the printer 1) by electric wiring 10b. Flexible wiring, such as a flat cable or flexible printed circuits (FPC), may be used as the electric wiring 10b. One end of the electric wiring 10b is connected to the electric board 11a. The other end of the electric wiring 10b is connected to the signal processor 1a of the image forming unit (the main body of the printer 1). The electric wiring 10b may be disposed to run near the hinge center 10a. In this way, the electric wiring 10b may have flexibility. When the sheet feeding tray cover 10 is rotated, the electric wiring 10b bends following the sheet feeding tray cover 10. That is, the electric wiring 10b bends in response to the movement of the sheet feeding tray cover 10. With this configuration, the electric wiring 10b can connect the electric board 11a and the signal processor 1a more reliably without disconnection.

The back surface portion of the operation unit 11 is protected by an operation unit rear cover 17 that covers the electric board 11a and the electric wiring 10b. The sheet feeding tray cover 10 is configured such that the rotation thereof is regulated at a position where the sheet feeding tray cover 10 extends in the vertical direction along the front surface of the printer 1. Thus, when the user places recording materials in the sheet feeding tray 105, the sheet feeding tray cover 10 is maintained such that the inside (the stacking face 105a) of the sheet feeding tray 105 is exposed, thereby improving the user's workability. In addition, the sheet feeding tray 105 may be detachable from the printer 1. The sheet discharge extension tray 113a is storable inside the printer 1. The sheet feeding tray cover 10 can be in a state where the sheet feeding tray cover 10 extends in the vertical direction along the front surface of the printer 1. Therefore, even where the operation unit 11 is provided in the sheet feeding tray cover 10, it is possible to not only reduce the installation space for the printer 1 when the printer 1 is not in use, but also prevent an increase in the packing size of the printer 1 at the time of transportation. This is illustrated in, for example, FIG. 3B.

According to this configuration, the operation unit 11 is disposed on the top surface of the sheet feeding tray cover 10 where the operation unit is easily accessible, so that the operation unit 11 of the printer 1 is easily viewable. This therefore makes it possible to improve the user's visibility of the operation unit 11. In the printer 1, typically, it is expected that a sufficient distance is maintained between the top surface of the printer 1 and the top surface of the space where the printer 1 is housed, and the operation unit 11 is operatively disposed thereon. Particularly, in this configuration, a sufficient space is secured above the operation unit 11, and operability for the user is not easily impaired. Therefore, restrictions in installing the printer 1, such as the need to install the printer 1 so as not to impair the operability for the user, are reduced, and the flexibility of the installation of the printer 1 increases. In other words, a configuration in which the operation unit 11 is provided in an area where both of the operability and the visibility can be satisfied is realized even if the printer 1 is downsized. For example, it is not necessary to have a protrusion for improving the visibility, so that the flexibility of the design of the printer 1 can be increased. Therefore, according to the present exemplary embodiment, it is possible to dispose various user interfaces without impairing the visibility and the operability of the user interfaces, while downsizing the image forming apparatus. The operation unit 11 may be located on the upper surface of the sheet feeding tray cover 10, which can only be accessed when the sheet feeding tray cover 10 is in an open position, allowing access to the sheet feeding tray 105.

In the present exemplary embodiment, the configuration in which the operation unit 11 having the plurality of functions is included as the user interface is adopted, but this is only an example. The user interface only needs to include at least one of notification units that each notify the user of information visually by emitting light using a lamp or an image display portion, or aurally by emitting a sound from a speaker, in addition to a button such as a push button and a switch such as a toggle switch. Therefore, the user interface may be an operation panel (a touch panel) on which information can be input by touching the image display portion.

Figure 4:
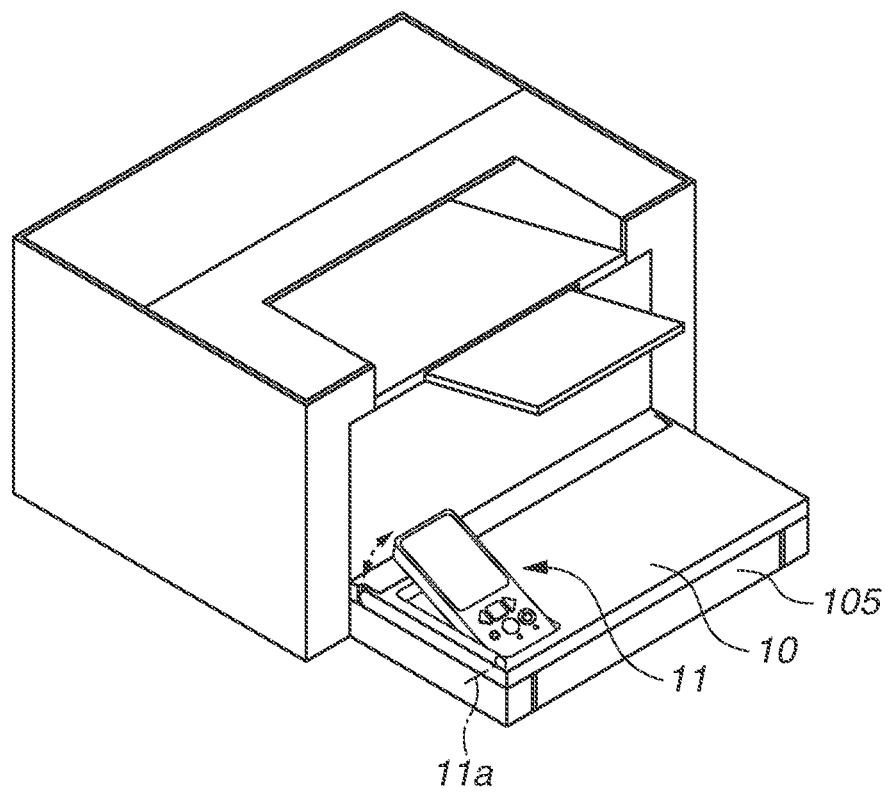
FIG. 4 is a perspective view schematically illustrating a movable operation unit of an image forming apparatus according to a modification of the first exemplary embodiment.

Further, the operation unit 11 in the present exemplary embodiment has been described as a unit fixed to the sheet feeding tray cover 10, but the configuration is not limited thereto. As illustrated in FIG. 4, there may be adopted such a configuration that the operation unit 11 is rotatable around an arbitrary support shaft (e.g., the hinge center 10a) on an end portion thereof and the operation unit 11 is tilted by an arbitrary angle relative to the horizontal plane to make the operation unit 11 face frontward.

Figure 5:
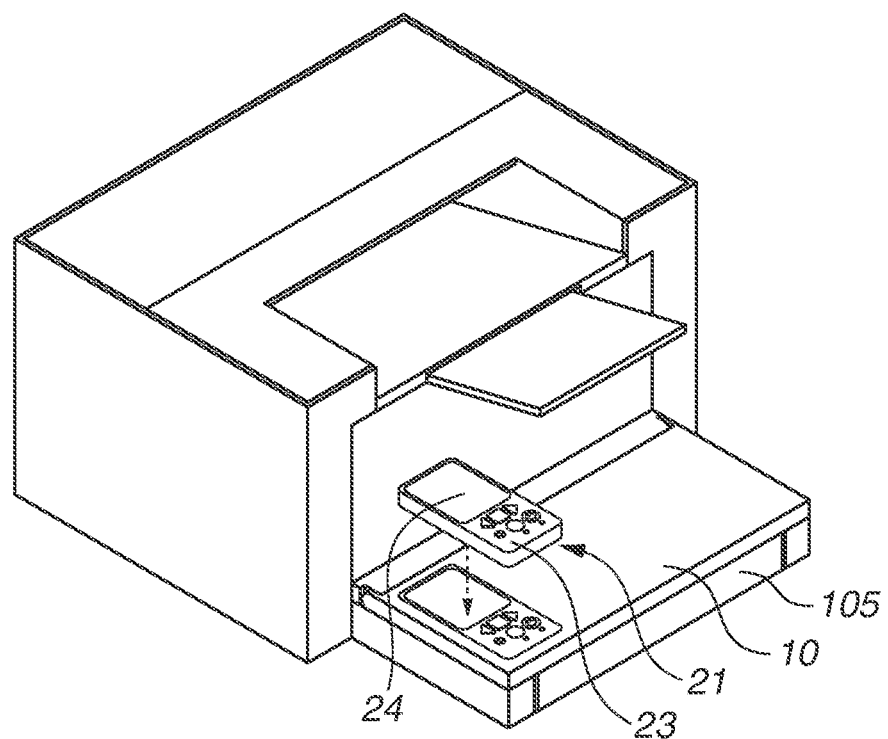
FIG. 5 is a perspective view schematically illustrating an image forming apparatus according to a modification of the first exemplary embodiment.

Further, as illustrated in FIG. 5, a configuration in which a wireless operation unit 21 is attachable to and detachable from a housing portion in the sheet feeding tray cover 10 may be adopted. In this case, the wireless operation unit 21 includes a display portion 24, various operation keys 23, and an electric board (not illustrated) disposed inside thereof, and is configured to communicate with the signal processor 1a disposed inside the main body of the printer 1.

The wireless operation unit 21 (the electric board) and the main body (the signal processor 1a) of the printer 1 may be configured to communicate with each other using infrared rays, but the configuration is not limited thereto. Other communication method and communication circuit may be adopted appropriately, based on, for example, a usage environment such as ultrasonic waves or radio waves.

Figure 6:
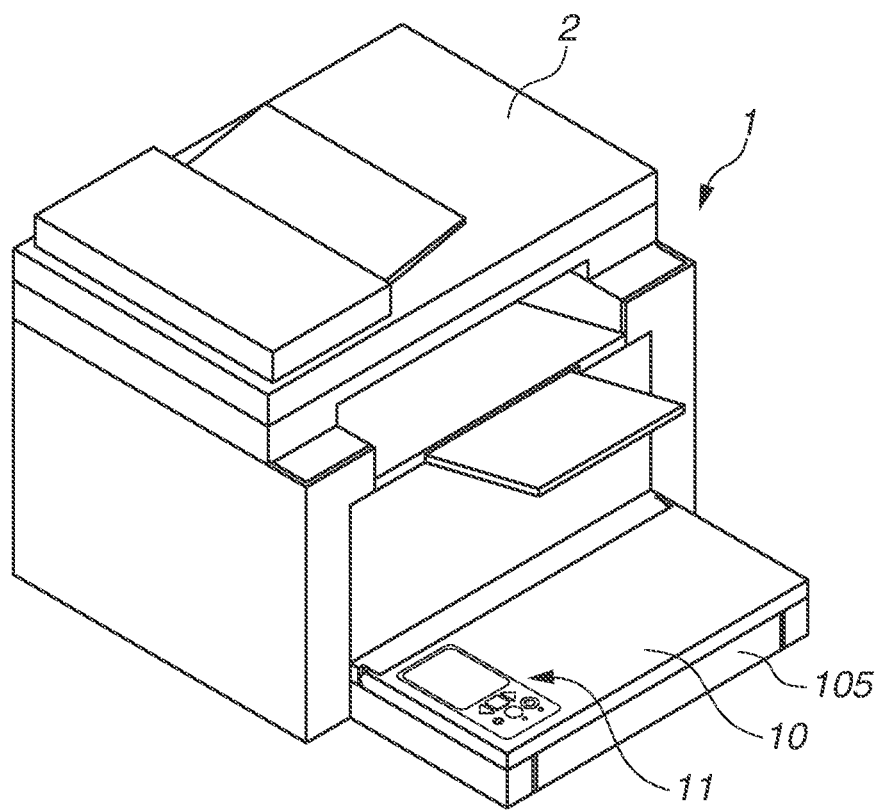
FIG. 6 is a perspective view schematically illustrating a multifunction peripheral including an image reading scanner as an image forming apparatus according to a modification of the first exemplary embodiment.

Further, in the present exemplary embodiment, the image forming apparatus is exemplified by the printer 1 not having an image reading device, but is not limited thereto. An image forming apparatus having an image reading device 2 and a facsimile function may be adopted as illustrated in FIG. 6. Furthermore, in the present exemplary embodiment, the image forming apparatus that forms an image in a laser method is described as an example, but other image forming methods, such as an inkjet method or a thermal method, may be also used.

Second Exemplary Embodiment

The second exemplary embodiment of the present invention will be described. Configurations similar to those of the first exemplary embodiment will not be described.

Figure 7:
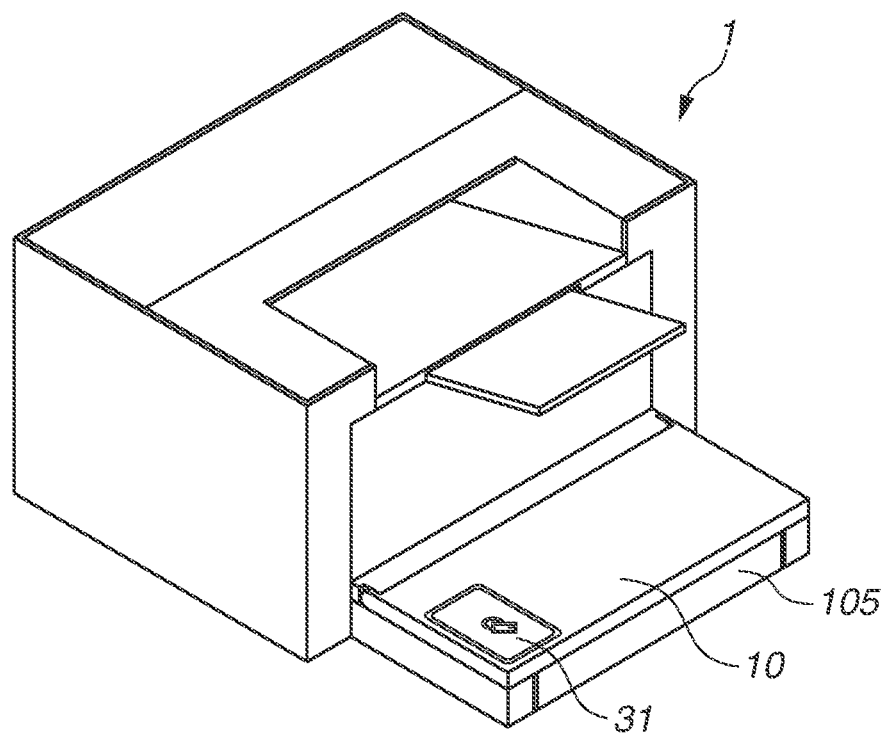
FIG. 7 is a perspective view schematically illustrating an image forming apparatus according to a second exemplary embodiment.

In the first exemplary embodiment, the operation unit 11 is provided on the top surface of the sheet feeding tray cover 10. In the present exemplary embodiment, a wireless communication port 31 is provided as the user interface, as illustrated in FIG. 7. The wireless communication port 31 is compliant with a standard for contactless wireless communication such as near field communication (NFC), and may be used to read information of a tag (e.g., a radio frequency identification chip) possessed by a user to perform user identification and the like. To be more specific, a configuration may be adopted, for example, in which tag information stored in an integrated circuit (IC) chip is acquired by placing a communication terminal (not illustrated), such as a card or portable terminal incorporating the IC chip and an antenna, over the wireless communication port 31 to perform the user identification. In this way, the user may place the communication terminal over the wireless communication port 31 of a printer 1 after transmitting print data to the printer 1 from a personal computer (PC), and the printer 1 may execute a print output operation after the user identification. This prevents a printed sheet from being taken out by a third party.

According to this configuration, the wireless communication port 31 is provided on the top surface of a sheet feeding tray cover 10. This makes the wireless communication port 31 easily viewable and accessible by the user. In other words, the user can easily bring the communication terminal near to the wireless communication port 31, so that the usability is improved. In addition, restrictions in installing the printer 1, such as the need to install the printer 1 so as not to impair operability for the user, are reduced. In other words, the user can install the printer 1 more freely. The wireless communication port 31 is provided in an area where both of the operability and the visibility can be satisfied even in the downsized printer 1. For example, it is not necessary for the printer 1 to have a protrusion for improving the visibility, so that the flexibility of the design of the printer 1 can be increased. Therefore, according to the present exemplary embodiment, it is possible to dispose various user interfaces in an image forming apparatus without impairing the visibility and the operability of the user interfaces, while achieving downsizing of the image forming apparatus.

In the present exemplary embodiment, near field wireless communication compliant with the NFC standard is used as a method of communication between the portable terminal and the wireless communication port 31. However, the method of communication is not limited thereto. The communication between the portable terminal and the wireless communication port 31 may be, for example, a method of transmitting information by radio waves in compliance with another communication standard, or may be communication compliant with a contactless wireless communication standard such as Wireless Fidelity (Wi-Fi) (a wireless local area network (LAN)) or Bluetooth®. According to this configuration, the wireless communication port 31 can be disposed at a position away from the main body of the printer 1, so that the influence of radiation noise emitted from the printer 1 is reduced, thereby making it possible to improve the stability of the communication between the portable terminal and the wireless communication port 31.

Figure 8:
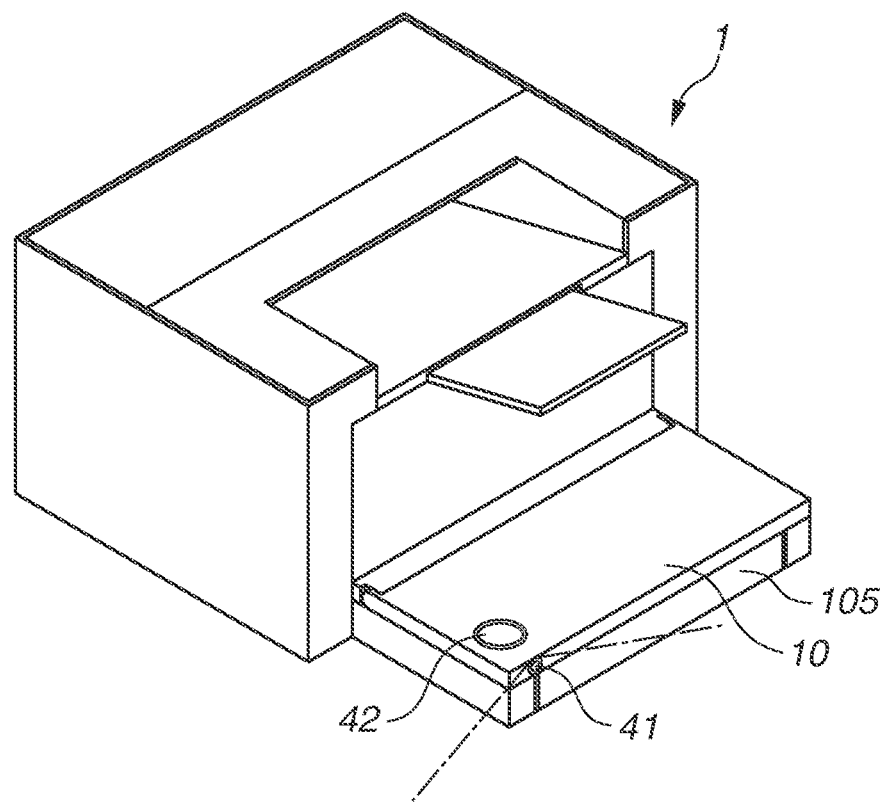
FIG. 8 is a perspective view schematically illustrating an image forming apparatus according to a modification of the second exemplary embodiment.

In the present exemplary embodiment, the wireless communication port 31 is provided to perform the user identification, but this is only an example. For example, as illustrated in FIG. 8, a fingerprint sensor 42 may be disposed on the top surface of the sheet feeding tray cover 10. A user places a finger over the fingerprint sensor 42, so that the fingerprint sensor 42 detects fingerprint information of the user, and user identification is performed by comparing the detected fingerprint information with pre-registered fingerprint information of the user. In this way, the user may place a finger over the fingerprint sensor 42 of the printer 1 after transmitting print data to the printer 1 from a PC. When the user identification is successful, the printer 1 executes a print output operation. This prevents a printed sheet from being taken out by a third party.

According to this configuration, the fingerprint sensor 42 is disposed on the top surface of the sheet feeding tray cover 10. This makes the wireless communication port 31 easily viewable and accessible by the user. As a result, the usability is improved.

The case where the fingerprint sensor 42 is used as the interface for performing the user identification has been described as an example, but this is only an example. For example, a sensor that can detect biometric information of the user such as iris, retina, vein, and voiceprint may be disposed on the top surface of the sheet feeding tray cover 10. In this case, the printer 1 compares information obtained by the sensor with pre-registered information to perform user identification. In this case as well, it is easy for the user to visually recognize the sensor and have access thereto. The usability is therefore improved. Moreover, the biometric information can be detected more reliably. In particular, in a case where the user identification is performed by voiceprint, voiceprint, i.e., user's voice, can be detected at a position away from the printer 1 by disposing the sensor at the top surface of the sheet feeding tray cover 10. The influence of a sound generated from the printer 1 is reduced, so that user's voice can be detected at a position closer to the user.

Further, as illustrated in FIG. 8, a motion sensor 41 may be disposed on the sheet feeding tray cover 10 as a user interface. In this way, the user interface is not limited to a user interface by which a user can directly input information, and may be a user interface that enables detection of information related to a user, such as the presence or absence of a user who can provide an image formation instruction to the printer 1.

The printer 1 has a plurality of power supply modes such as a sleep mode for reducing power consumption, a standby mode in which a printing operation is in a preparation phase, and a print mode in which printing is in progress. Normally, the printer 1 changes to the sleep mode after a predetermined time has elapsed without performing any printing operation. In a case where a printing operation is performed again, the printer 1 changes to the standby mode in response to some trigger to the printer 1, such as operation of a button or an input from a sensor.

The motion sensor 41 may be a device that detects a movement of a person (a movable body) near the printer 1. In this case, when the motion sensor 41 detects a movement of a person (a movable body) within a detection area, the printer 1 cancels the sleep mode and changes to the standby mode. In other words, the printer 1 changes from the sleep mode to the standby mode without waiting for an operation by the user. As a result, a waiting time for changing from the sleep mode to the standby mode is reduced, so that the usability is improved.

As described above, if the motion sensor 41 is provided on the sheet feeding tray cover 10, obstructions that hinder the detection by the motion sensor 41 are reduced. The motion sensor 41 therefore can detect the presence or absence of a person (a movable body) in a wide area. In other words, the necessity for providing a protrusion in the printer 1 to enhance the detectability of the motion sensor 41 is decreased, and thus the flexibility of the design of the printer 1 increases. Moreover, restrictions in an installation location of the printer 1 are reduced, so that the flexibility of the installation of the printer 1 increases. According to the present exemplary embodiment, it is possible to dispose various user interfaces in an information forming apparatus without impairing the visibility and the operability of the user interfaces, and at the same time, downsizing of the image forming apparatus can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
   an image forming unit configured to form an image on a recording material;
   a controller configured to control the image forming unit;
   a main body of the image forming apparatus, wherein the main body includes the controller and the image forming unit;
   a sheet feeding tray configured to store a recording material to be supplied to the image forming unit, wherein the sheet feeding tray is detachable from the image forming apparatus;
   a sheet feeding tray cover connected to the main body and configured to cover the recording material stored on the sheet feeding tray; and
   a user interface unit provided on the sheet feeding tray cover and connected to the controller via a wiring and configured to input information into the controller or output information from the controller,
   wherein the sheet feeding tray cover is rotatable relative to the main body, and the user interface unit is connected to the controller via the wiring while the sheet feeding tray cover is rotating relative to the main body.

2. The image forming apparatus according to claim 1, wherein the user interface unit is located on an upper surface of the sheet feeding tray cover, and the sheet feeding tray is configured such that the sheet feeding tray can only be accessed when the sheet feeding tray cover is opened to a position that allows access to the sheet feeding tray.

3. The image forming apparatus according to claim 1, wherein the user interface unit is provided on a top surface of the sheet feeding tray cover.

4. The image forming apparatus according to claim 1, further comprising an apparatus main body,
   wherein the image forming unit is provided in the apparatus main body, and
   wherein one end of the sheet feeding tray cover is connected to the apparatus main body.

5. The image forming apparatus according to claim 4, wherein the sheet feeding tray cover is rotatable between a first position and a second position, the sheet feeding tray cover is vertical to the sheet feeding tray in a case where the sheet feeding tray cover is at the first position, and the sheet feeding tray cover is parallel to the sheet feeding tray and covers the recording material stored on the sheet feeding tray in a case where the sheet feeding tray cover is at the second position.

6. The image forming apparatus according to claim 1, wherein, when the sheet feeding tray cover is rotated, the wiring bends in response to movement of the sheet feeding tray cover.

7. The image forming apparatus according to claim 1, wherein the user interface unit includes a power switch of the image forming apparatus.

8. The image forming apparatus according to claim 1, wherein the user interface unit includes an input device by which information is input according to a user operation.

9. The image forming apparatus according to claim 1, wherein the user interface unit includes a wireless communication circuit for acquiring tag information of a portable terminal by wireless communication.

10. The image forming apparatus according to claim 1, wherein the user interface unit includes a sensor configured to detect movement of a person.

11. The image forming apparatus according to claim 1, wherein the user interface unit includes a sensor configured to detect biometric information for user identification.

12. The image forming apparatus according to claim 1, wherein the user interface unit includes a display device configured to display information from the image forming unit.

13. The image forming apparatus according to claim 1, wherein the user interface unit includes a sound output device configured to notify, by outputting sound to a user, information from the image forming unit.

* * * * *